(12) United States Patent
Bridgelall

(10) Patent No.: US 7,516,057 B2
(45) Date of Patent: Apr. 7, 2009

(54) METHOD FOR OPTIMIZING THE DESIGN AND IMPLEMENTATION OF RFID TAGS

(75) Inventor: Raj Bridgelall, Mount Sinai, NY (US)

(73) Assignee: Symbol Technologies, Inc., Holtsville, NY (US)

( * ) Notice: Subject to any disclaimer, the term of this patent is extended or adjusted under 35 U.S.C. 154(b) by 618 days.

(21) Appl. No.: 10/830,273

(22) Filed: Apr. 21, 2004

(65) Prior Publication Data
US 2005/0030201 A1 Feb. 10, 2005

Related U.S. Application Data

(60) Provisional application No. 60/464,234, filed on Apr. 21, 2003.

(51) Int. Cl.
*G06F 17/50* (2006.01)
*G08B 13/189* (2006.01)

(52) U.S. Cl. .................. 703/13; 340/572.1; 340/572.4; 340/572.5

(58) Field of Classification Search .................. 703/13; 340/572.1, 572.4, 572.5
See application file for complete search history.

(56) References Cited

U.S. PATENT DOCUMENTS

| 5,682,143 | A | * | 10/1997 | Brady et al. | 340/572.7 |
| 5,854,589 | A | * | 12/1998 | How et al. | 340/551 |
| 5,940,006 | A | * | 8/1999 | MacLellan et al. | 340/10.1 |
| 5,999,861 | A | * | 12/1999 | Dove et al. | 700/182 |
| 6,078,791 | A | * | 6/2000 | Tuttle et al. | 455/90.1 |
| 6,147,605 | A | * | 11/2000 | Vega et al. | 340/572.7 |
| 6,281,794 | B1 | * | 8/2001 | Duan et al. | 340/572.1 |
| 6,407,669 | B1 | * | 6/2002 | Brown et al. | 340/572.1 |
| 6,466,131 | B1 | * | 10/2002 | Tuttle et al. | 340/572.7 |
| 6,480,110 | B2 | * | 11/2002 | Lee et al. | 340/572.5 |
| 6,593,841 | B1 | * | 7/2003 | Mizoguchi et al. | 336/200 |
| 6,693,541 | B2 | * | 2/2004 | Egbert | 340/572.7 |
| 6,840,440 | B2 | * | 1/2005 | Uozumi et al. | 235/375 |
| 6,999,028 | B2 | * | 2/2006 | Egbert | 343/700 MS |
| 7,026,935 | B2 | * | 4/2006 | Diorio et al. | 340/572.2 |
| 7,055,754 | B2 | * | 6/2006 | Forster | 235/492 |
| 7,132,946 | B2 | * | 11/2006 | Waldner et al. | 340/572.1 |
| 7,154,283 | B1 | * | 12/2006 | Weakley et al. | 324/750 |
| 7,183,926 | B2 | * | 2/2007 | Diorio et al. | 340/572.4 |

(Continued)

OTHER PUBLICATIONS

WO/2000/016277) Method and Apparatus for an Optimized Circuit for an Electrostatic Radio Frequency Identification Tag.*

(Continued)

*Primary Examiner*—Kamini S Shah
*Assistant Examiner*—Akash Saxena

(57) ABSTRACT

A method is provided for optimizing the design parameters of a RFID tag for use with a RFID reader in a RFID system. In the method, a desired frequency band that the RFID tag will operate in is chosen. Additionally, a maximum acceptable cost for the RFID tag, a minimum acceptable data range for the RFID tag and a minimum operating voltage for the RFID tag are chosen. For a given cost, an optimal data rate is calculated by varying a carrier modulation period of an interrogation signal generated by the RFID reader and antenna capacitance of the RFID tag. Next, an optimal range for a given operating voltage is calculated using the optimal data rate.

15 Claims, 10 Drawing Sheets

U.S. PATENT DOCUMENTS

| | | | |
|---|---|---|---|
| 2002/0097153 A1* | 7/2002 | Youbok et al. | 340/572.5 |
| 2002/0175805 A9* | 11/2002 | Armstrong et al. | 340/10.31 |
| 2003/0016133 A1* | 1/2003 | Egbert | 340/572.7 |
| 2004/0130438 A1* | 7/2004 | Garber | 340/10.2 |
| 2005/0007239 A1* | 1/2005 | Woodard et al. | 340/10.2 |
| 2005/0092845 A1* | 5/2005 | Forster | 235/492 |
| 2005/0099270 A1* | 5/2005 | Diorio et al. | 340/10.51 |
| 2005/0154570 A1* | 7/2005 | Sweeney | 703/13 |
| 2005/0154572 A1* | 7/2005 | Sweeney | 703/13 |
| 2005/0225435 A1* | 10/2005 | Diorio et al. | 340/10.5 |
| 2005/0258966 A1* | 11/2005 | Quan | 340/572.7 |
| 2006/0044192 A1* | 3/2006 | Egbert | 343/700 MS |
| 2006/0164249 A1* | 7/2006 | Lutz et al. | 340/572.7 |
| 2007/0001851 A1* | 1/2007 | Reynolds et al. | 340/572.1 |

OTHER PUBLICATIONS

Evolutionary design of miniaturized meander-line antennas for RFID applications Marrocco, G.; Fonte, A.; Bardati, F.; Antennas and Propagation Society International Symposium, 2002. IEEE vol. 2, Jun. 16-21, 2002 pp: 362-365 vol.*

Experimental Examinations of the Logistics Parameters of an Inductive Radio Frequency Identification Systems; Csaba Dinnyés and Béla Kulcsár; Periodica Polytechnica Ser. Transp. Eng. vol. 27, No. 1-2, pp. 101-112 (1999).*

Behavioral Modeling and Simulation of Antennas : Radio-Frequency Identification case study; V. Beroulle, R. Khouri, T. Vuong, S. Tedjini; 2003 IEEE.*

Design of Ultra-Low-Cost UHF WFID Tags for Supply Chain Applications by Rob Glidden.et al; IEEE 2004, pp. 140-151.*

Tag Tuning; www.atmel.com; pp. 1-7, 2002.*

Rautio, J.B. Electromagnetic Analysis Speeds RFID Design. Microwaves & RF., Feb. 2003. vol. 42 No. 2, pp. 55-62.

Cichos, S. et al. Performance Analysis of Polymer based Antenna-Coils for RFID. Second International IEEE Conference on Polymers and Adhesives in Microelectronics and Photonoics. Jun. 2002, pp. 120-124.

Chen, S.C. et al. Optimization of Inductive RFID Technology. Proceedings of the 2001 IEEE International Symposium on Electronics and the Environment. May 2001, pp. 82-87.

Sorrells, P. Optimizing Read Range in RFID Systems. EDN. Dec. 7, 2000, vol. 45 No. 25, pp. 173-184.

* cited by examiner

|   | VALUE | UNITS | DEFINITION |
|---|---|---|---|
| | | | RECEIVING ANTENNA AND IMPEDANCE MATCHING |
| c | $3 \cdot 10^8$ | m/s | SPEED OF LIGHT |
| $f_o$ | 915 | MHz | FREQUENCY OF RF CARRIER |
| $\lambda$ | $c/f_o$ | m | WAVELENGTH OF THE RF CARRIER |
| $\psi_r$ | 1.5 | | RECEIVING ANTENNA POWER GAIN. |
| $P_s$ | 4 | W | AVERAGE POWER LAUNCHED BY INTERROGATING TRANSMITTER. |
| $P_r$ | | μW | AVERAGE POWER CAPTURED BY THE SENSOR'S ANTENNA APERTURE. |
| $P_d$ | | μW | AVERAGE POWER DELIVERED TO THE INTREGRATED CIRCUIT. |
| $L_a$ | | μH | LUMBED ANTENNA INDUCTANCE |
| $C_a$ | 1 | pF | LUMBED ANTENNA CAPACITANCE |
| Q | | | QUALITY FACTOR OF THE ANTENNA AND MATCHING RESONANT CIRCUIT. |
| $R_m$ | | Ω | LUMPED RESISTIVE LOSSES IN THE FRONT-END BAND-PASS CIRCUITRY. |
| | | | INTEGRATED CIRCUIT POWER REGULATION |
| n | 1.2 | | RECTIFICATION JUNCTION EMISSION COEFFICIENT. |
| $V_T$ | 26 | mV | kT/q WHERE k=BOLZMANN'S CONSTANT[JOULES/KELVIN], T=TEMPERATURE [KELVIN], q=ELECTRON CHARGE [COULOMBS] |
| $I_o$ | 3 | μA | RECTIFIER JUNCTION REVERSE SATURATION CURRENT. |
| $\eta_c$ | 95 | % | VOLTAGE REGULATION EFFICIENCY. |
| $\eta_r$ | 97 | % | RECTIFIER EFFICIENCY. |
| $\delta_w$ | 500 | mV | REGULATOR HYSTERESIS WINDOW SIZE. |
| $V_L$ | 1.25 | mV | LOWER THRESHOLD VOLTAGE WHEN POWER REGULATION TERMINATES. |
| | | | INTEGRATED CIRCUIT OPERATION |
| $P_a$ | 50 | μW | AVERAGE POWER CONSUMED BY THE IC LOGIC DURING SENSOR ACTIVITY. |
| $P_{co}$ | | μW | MINIMUM REQUIRED ENERGY STORAGE RATE. |
| $t_{AM}$ | 2 | μs | MAXIMUM CARRIER MODULATION PERIOD. |
| $R_{bit}$ | 62.5 | kbps | MAXIMUM BIT RATE IN KILO-BITS PER SECOND. |
| $\tau_D$ | | % | INTERROGATOR CW DUTY CYCLE. |
| $t_{init}$ | | μs | INITIAL ENERGY ACCUMULATION PERIOD. |
| | | | RECIEVING ANTENNA AND IMPEDANCE MATCHING |
| $D_r$ | 1.5 | | DIRECTIVITY OF SENSOR ANTENNA. |
| $\gamma_r$ | 0.99 | | ANTENNA IMPEDANCE MATCHING EFFICIENCY. |
| $\psi_r$ | $D_r\gamma_r$ | | RECEIVING ANTENNA POWER GAIN. |
| $P_m$ | | μW | AVERAGE POWER DISSIPATED (LOST)IN THE ANTENNA MATCHING CIRCUIT. |
| | | | INTEGRATED CIRCUIT POWER REGULATION |
| $P_c$ | | μW | AVERAGE POWER CONSUMED BY THE INTEGRATED LOGIC AND REGULATOR. |
| $V_b$ | | mV | AVERAGE BIAS VOLTAGE PRODUCED ACORSS THE INTEGRATED CIRCUIT (IC). |
| $V_d$ | | mV | RECTIFIER ACTIVIATION BIAS THRESHOLD VOLTAGE. |
| $V_p$ | | mV | UPPER THRESHOLD VOLTAGE TO INITIATE POWER REGULATION. |
| $C_p$ | | pF | CHARGE STORAGE CAPACITANCE. |
| $t_{rec}$ | | μs | CARRIER RECOVERY PERIOD FROM AM MODULATION |
| | | | SEMICONDUCTOR FABRICATION |
| | 0.35 .25 | micron | SEMICONDUCTOR FABRICATION PROCESS FEATURE SIZE. |
| $D_c$ | 4  4.2 | fF/μm² | SILICON CAPACITANCE DENSITY. |
| $N_G$ | 25,000 | | TOTAL NUMBER OF GATES REQUIRED FOR THE SENSOR'S LOGIC. |
| $A_G$ | 9.6  4.7 | μm² | AVERAGE AREA PER DIGITAL GATE. |
| $\zeta$ | 12  14 | ¢/mm² | AMORTIZED AVERAGE COST PER UNIT AREA OF SILICON SENSOR IN 2002. |

*FIG. 2*

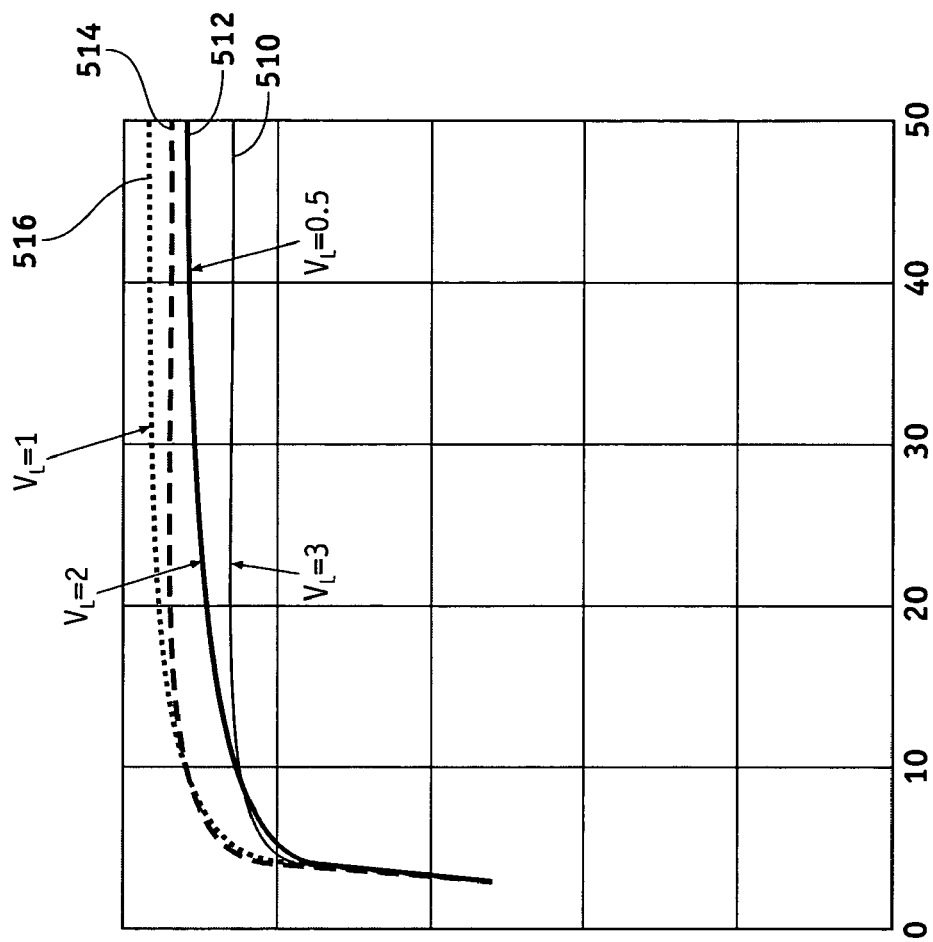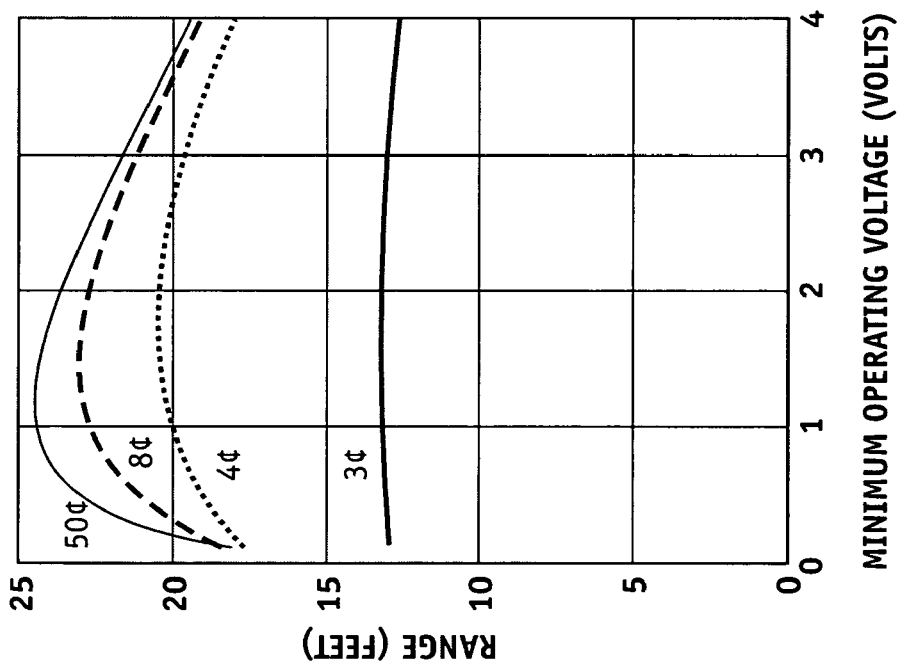
FIG. 5A-5B
FIG. 5B
FIG. 5A

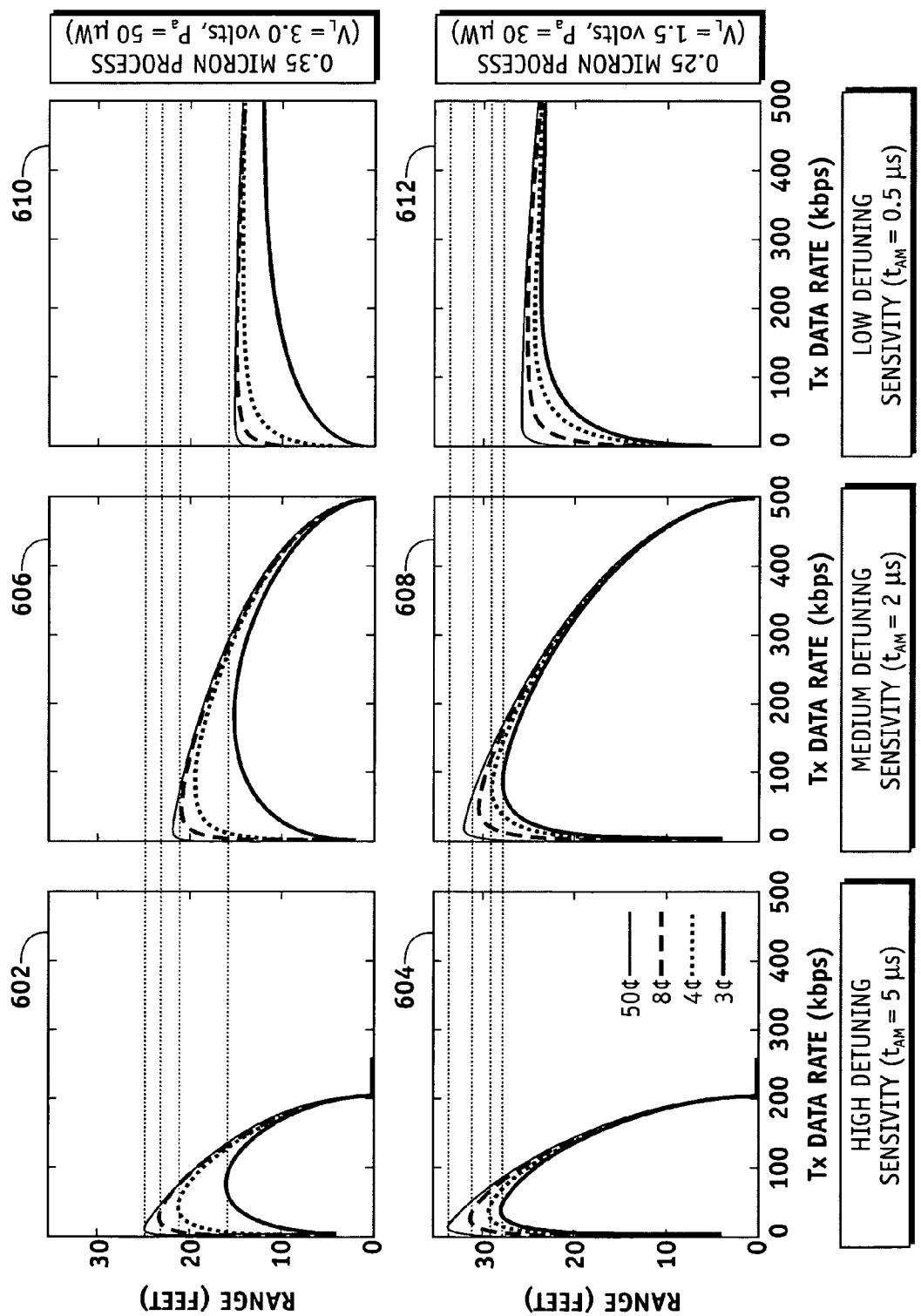

METHOD FOR OPTIMIZING THE DESIGN AND IMPLEMENTATION OF RFID TAGS

CROSS REFERENCE TO RELATED APPLICATIONS

This application claims the benefit of provisional application No. 60/464,234, filed on Apr. 21, 2003.

TECHNICAL FIELD OF THE INVENTION

This invention relates generally to the field of radio frequency identification systems, and more particularly to a method for optimizing the design and implementation of RFID tags.

BACKGROUND OF THE INVENTION

Passive RFID tags are highly reliable battery-less electronic devices primarily employed to streamline logistical and manufacturing processes. Passive RFID tags can be attached to physical objects that are either remote or are in motion, and provide dozens of bits of unique error-correctable identification. Higher performance RFID tags also include rewritable electronic memory and environmental transduction. For example, pressure RFID tags inside industrial tires automatically relay profiles to a central server that triggers maintenance, thus improving performance, reliability, and reducing replacement cost. Simpler identification RFID tags transmit a unique identification associated with the object in transit, for example a pallet load or a case of expensive fragrance.

In a typical RFID system, RFID tags (also referred to as transponders) are located on an asset to be tracked. A RFID reader (also referred to as an interrogator), which typically contains a radio frequency (RF) transceiver, when triggered, sends a radio frequency signal (an interrogation) towards the RFID tag. In a typical embodiment, the RF signal, also known as the carrier signal, initially supplies a voltage to the antenna coil of the RFID tag. The received voltage is rectified in the RFID tag to supply power for the RFID tag. The RFID reader modulates the carrier signal, using, in an exemplary embodiment, amplitude modulation (or AM modulation) to send data (such as a request for the RFID tag to provide information such as the RFID tag's identification number) to the RFID tag. The RFID tag responds by modulating the carrier signal and back scattering the modulated signal to the RFID reader.

The tags can either be active tags, which may transmit continuously or periodically, or passive tags, which transmit in response to an interrogation. Active tags are typically battery powered. Passive tags are typically powered without contact by the electrical or mechanical field generated by the reader.

When using an RFID system consideration might be given to the RFID tag to select for a given purpose. Typically, a user of RFID tags attempts to optimize certain properties of a RFID tag such as the range of the tag (maximum distance between the RFID reader and the RFID tag that communications can occur), the data rate of the tag and the cost of the tag. However, there is a complex relationship between these parameters and other parameters that are to be optimized.

As an example, FIG. 1 illustrates the dependencies of parameters within an optimization framework. In this example, data rate 102, range 104 and cost 106 are the parameters to be optimized and appear on the vertices of an optimization triangle. As can be seen in FIG. 1 these parameters depend on other factors. For example, range 104 is dependent on bandwidth, sideband formation, transmission power, wavelength used, antenna gain, the sensitivity to detuning, logic power, the efficiency of the voltage regulator and rectifier in the tag. Some of these parameters are constrained by regulations. For example, different countries allow RFID systems to operate in different frequency ranges and at different power levels. Some parameters are dependent on the semiconductor fabrication technology used. For example, the operating voltage is dependent on the semiconductor fabrication technology, as is the capacitance and gate density of the integrated circuit of the RFID tag. Similarly, the cost 106 and data rate 102 are also affected by different parameters, as shown in FIG. 1, which in turn are affected by regulations, operating environment and semiconductor manufacturing techniques.

Therefore, it is desirable to develop an operational model for passive RFID tags that relate key parameter dependencies and develop a method for optimizing the design and implementation of RFID tags.

BRIEF SUMMARY OF THE INVENTION

In one embodiment of the present invention, a method is provided for optimizing the design parameters of a RFID tag for use with a RFID reader in a RFID system. In the method, a desired frequency band that the RFID tag will operate in is chosen. Additionally, a maximum acceptable cost for the RFID tag, a minimum acceptable data range for the RFID tag and a minimum operating voltage for the RFID tag are chosen. For a given cost, an optimal data rate is calculated by varying a carrier modulation period of an interrogation signal generated by the RFID reader and antenna capacitance of the RFID tag. Next, an optimal range for a given operating voltage is calculated using the optimal data rate.

BRIEF DESCRIPTION OF THE DRAWINGS

The present invention will hereinafter be described in conjunction with the following drawing figures, wherein like numerals denote like elements.

FIG. 2 shows a table listing variables used in the exemplary equations;

FIG. 5a shows a graph illustrating the relationship between minimum operating voltage and range;

FIG. 5b shows a graph illustrating the relationship between IC cost and range;

FIG. 6 shows a graph illustrating the relationship between data and range for different IC designs and different determining rates;

DETAILED DESCRIPTION OF THE INVENTION

The following detailed description of the invention is merely exemplary in nature and is not intended to limit the invention or the application and uses of the invention. Furthermore, there is no intention to be bound by any theory presented in the preceding background of the invention or the following detailed description of the invention.

The present invention, in one exemplary embodiment, provides a method for optimizing the selection of RFID tags. In order to optimize the selection of RFID tags, the relationships between RFID tag parameters are related in a series of derived equations. The various equations illustrate the tradeoffs that occur when optimizing certain parameters. Important parameters and variables, as well as exemplary values for certain variables, which are used in the derivation of the following equations, are listed in the table of FIG. 2. While the following figures and examples discuss the optimization of passive RFID tags, the concepts are applicable to semi-passive tags and active tags as well as other analog sensors. These relationships can be illustrated in the following equations.

To begin, note that the received power, $P_r$, by an antenna sub-system in the far field is given as:

$$P_r = \left(\frac{\lambda}{4\pi}\right)^2 \frac{1}{r^2} P_s \psi_r \qquad \text{Eq. 1}$$

where $\lambda$ is the wavelength of the carrier signal, r is the distance between the source of the carrier signal and the antenna sub-system, $\psi_r$ is the gain in the receiving antenna and $P_s$ is the transmitted power. The transmitted power, $P_s$, includes the power gain of the transmitting antenna. The receiving antenna power gain is the product of the receiving antenna directivity and the impedance matching efficiency of the power transfer circuit. The matching circuit efficiency, $\gamma_r$, is derived from the voltage-standing-wave-ratio (VSWR) of the antenna impedance matching circuitry where, $$\gamma_r = \frac{4(VSWR)}{[(VSWR)+1]^2} \qquad \text{Eq. 2}$$

The above is a relatively simple model based on far-field RF propagation in free-space. The above far-field model does not take into account the various regulatory requirements set by different countries and localities regarding RF transmission. Nor does this model take into account semiconductor fabrication parameters such as limitations inherent in semiconductor design. Therefore, a more rigorous model that illustrates the trade-offs and optimization of various design parameters for meeting performance and cost objectives is needed.

Figure 3:
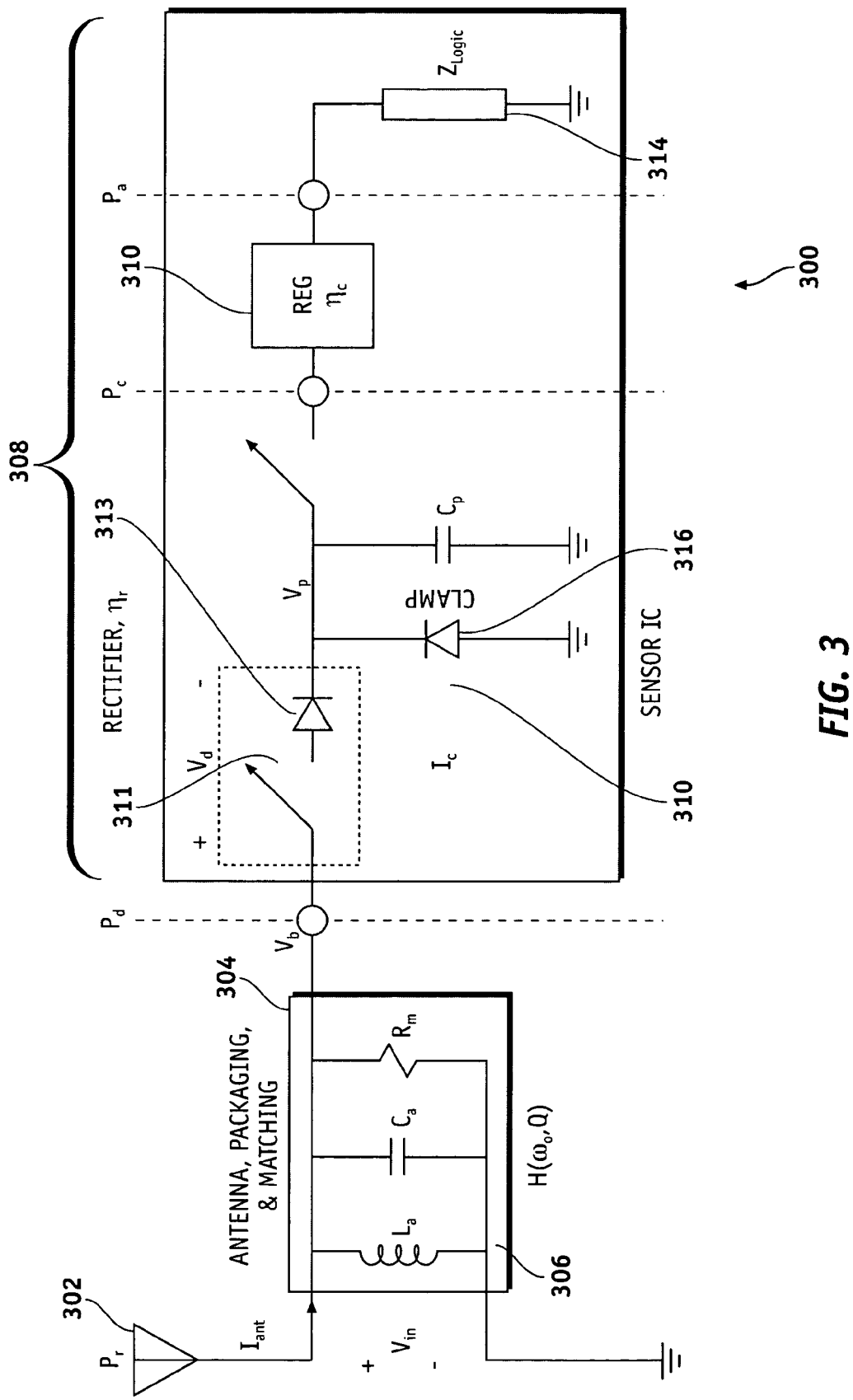
FIG. 3 illustrates an exemplary RFID tag.

To begin the derivation of a more rigorous model, an exemplary model of the power capture and conditioning circuit 300 of a typical passive RFID tag is illustrated in FIG. 3. Circuit 300 includes an RFID antenna 302 coupled to a matching circuit 304, which includes a resonant circuit 306. The matching circuit 304 is coupled to an IC 308, which includes a rectifying circuit 310, a regulation circuit 312 and a logic circuit 314. Rectification circuit 310 includes a storage capacitor, $C_p$, and a clamping diode 316. The various components and design of circuit 300 are known to one skilled in the art and are commercially available.

In operation, the power captured by the RFID tag's antenna 302 is converted into a current, $I_{ant}$, which flows across the antenna's 302 effective radiation resistance, parasitic resistances, and the reactive components. The matching circuit 304 transforms the source impedance to match the load impedance for maximum power transfer. The combination of antenna impedances and impedance matching circuitry can be modeled as lumped parallel RLC resonant circuit 306 as shown in FIG. 3. RLC resonant circuit 306 has a band-pass filter response. The non-dissipative reactive elements can be ignored and the power dissipation characterized as a single resistive component, $R_m$, per carrier frequency. For each narrow-band resonant tank in the composite band-pass response, the resistive component, $R_m$, is directly related to its associated composite Q-factor. The Q-factor, or Quality Factor, defines how well the resonating circuit absorbs power over its resonance band.

The received power is transferred to IC 308. The energy storage capacitor, $C_p$, receives power from the matching circuit 302 via rectification circuit 310. A switch 311 and a diode 313 represent the rectification junction of rectification circuit 310. The rectification circuit 310 has a power rectification efficiency, $\eta_r$. The power rectification efficiency, $\eta_r$, reflects departure from an ideal rectification, and is not the power efficiency of rectification. The efficiency, for example, reflects full-wave versus half-wave rectification but does not include the dynamic power dissipation losses across the rectification junction. For full-wave rectification, the switch 311 closes and current flows through the diode 313 and into the charge storage capacitor, $C_p$, twice each carrier cycle.

The voltage regulator 310 of the tag delivers an average power, $P_a$, to the microchip with efficiency, $\eta c$:

$$P_c = \frac{P_a}{\eta_c} \qquad \text{Eq. 3}$$

where, $P_c$, is the average power consumed by the integrated circuit logic and the regulator 310. The regulator 310 and the IC logic 308 become active and consume energy once the charge storage capacitor, $C_p$, reaches a predetermined upper threshold voltage $V_p$. Energy flow to the storage capacitor, $C_p$, abates during interrogator AM modulation. In addition, energy flow to the storage capacitor ceases during periods of antenna detuning as the RFID tag backscatter modulates the carrier signal. The RFID tag must be able to sustain operation during any bit modulation period, either in the forward or reverse communications link.

Figure 4:
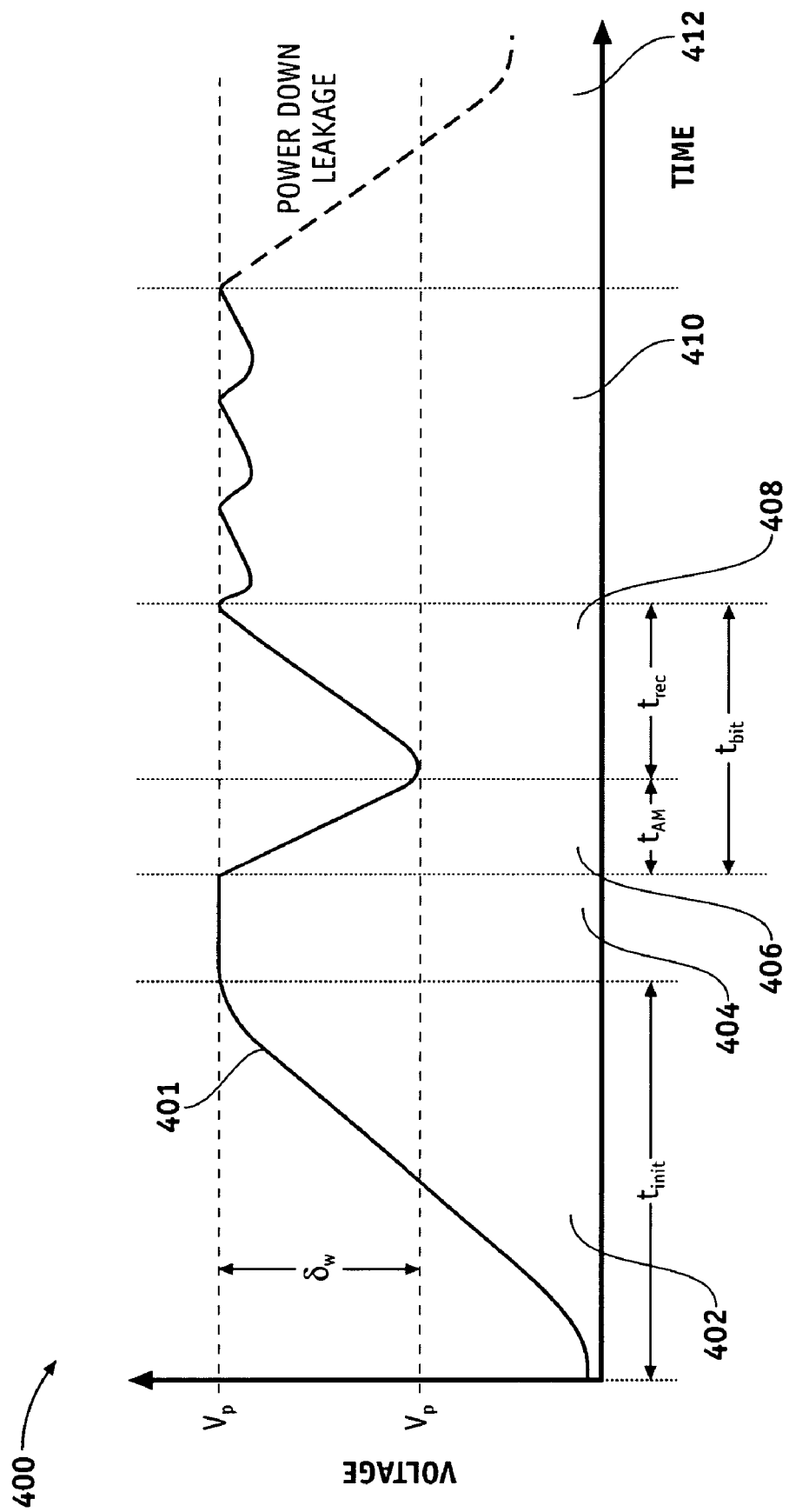
FIG. 4 shows a graph illustrating the energy accumulation of the storage capacitor of an RFID tag in accordance with the teachings of the present invention.

FIG. 4 illustrates the energy accumulation of the storage capacitor, $C_p$, during an interrogation of the tag by an interrogator (RFID reader). A graph 400 of the energy profile 401 is shown in FIG. 4. When the interrogator starts an interrogation, a radio frequency signal is sent. Upon receipt of the RF signal, the RFID tag's front-end resonant circuitry, which consists of the antenna 302 and matching circuit 304, produces a signal ramp. The voltage across the storage capacitor, $C_p$, will ramp from zero volts to its final value, $V_p$. This is illustrated as region 402 of FIG. 4. The voltage remains clamped to that value (region 404) by the clamping diode 316 until the storage capacitor, $C_p$, discharges during AM modulation (region 406). The circuit 300 is designed such that the maximum duration of the AM modulation will always be less than the minimum time that it takes for the storage capacitor to discharge to the lower operating threshold voltage $V_L$.

After the AM modulation, there is a second ramp up during which the voltage across the storage capacitor builds back to $V_p$. This is known as the AM recovery period and is shown as region 408. The RFID replies to the interrogation with a backscattered signal. During this reply period, the voltage drops when the RF carrier signal is modulated (signal being backscattered to the interrogator or RFID reader) and recovers by increasing when the RF carrier is present. This is seen in region 410. After the interrogation and reply have finished, the voltage in the capacitor will decrease to zero due to leakage as seen in region 412.

The maximum interrogation bit rate, $t_{bit}$, is limited by the sum of the AM modulation period, $t_{AM}$, and the charge recovery period, $t_{rec}$, in the AM recovery phase. The AM recovery period depends on the rate of energy collection of the RFID tag, the Q-factor of the RF front-end of the RFID tag, and the size of the regulator hysteresis window, $\delta_w$ (the hysteresis window is the difference between the final voltage, $V_P$, and the threshold voltage, $V_L$). The rate of energy collection is assumed to be approximately constant during a single interrogation cycle. That is, it is assumed that the RFID tag has moved, at most, only a negligible distance during the interrogation cycle. The regulator 310 delivers a constant voltage to the digital logic as long as the input supply voltage remains within the specified hysteresis window $\delta_w$. A sufficiently large hysteresis window helps to prevent the RFID tag from prematurely shutting down during an interrogation cycle by providing a relatively low threshold voltage, $V_L$.

As the digital logic of the tag consumes power, $P_a$, during its active period, the storage capacitor voltage, $v_p$, will change at a rate that is dependent on the net storage rate. For example, when the RFID tag is very close to the interrogator, the RFID tag will capture energy at a much faster rate than the logic can consume the power. Therefore, the storage capacitor voltage will rise relatively fast but will remain clamped near the upper threshold voltage $V_P$ due to the clamping diode 316. Clamping the voltage protects the integrated circuit 308 from receiving too great a voltage. Conversely, if the carrier periodically suspends, such as, for example, during AM modulation, the charge stored in the storage capacitor must be large enough, and the cut-off threshold $V_L$ low enough to sustain operation for the entire time when the carrier is periodically suspended (such as during the modulation period $t_{AM}$).

During the periods when the RFID tag backscatters, the RF front-end reflects energy and, therefore, the storage capacitor must supply reserve energy to the digital logic. Since backscatter signaling generates reflections rather than sourced electromagnetic emissions, regulatory compliance can be achieved without limiting the data rate for backscattered signals. Therefore, the backscatter data rate is generally greater than the interrogator data rate. Hence, the backscatter bit modulation periods are significantly shorter than the carrier AM modulation periods. Therefore, the storage capacitor, $C_p$, is not likely to discharge to the minimum operating voltage during backscatter signaling. This can be seen in section 410 of FIG. 4. The energy profile 401 does not drop to the lower threshold voltage during RFID tag backscatter modulation.

Once the interrogator receives the final reply from the RFID tag, the interrogator powers down the carrier signal. The RFID tag's digital logic will remain in the powered state until the charge on the storage capacitor leaks off below the minimum operating voltage threshold, $V_L$.

As discussed previously, the RFID tag utilizes stored energy during carrier AM modulation or RFID tag backscatter modulation. During modulation recovery, the carrier must replenish the spent energy as well as deliver sufficient power to maintain operation for the remainder of the bit period. This implies that on average, the RF carrier must deliver energy at a rate that is higher than the average rate the RFID tag consumes during AM modulation. Typical design specifications require a faster RFID tag backscatter modulation rate (reverse link) than the interrogator carrier modulation rate (forward link.) This constraint is usually imposed because regulatory compliance for passive backscatter systems is based solely on the interrogator output power and the RF carrier modulation period, and not the RFID tag's backscatter characteristics. Since the interrogator's output power and the RF carrier modulation period are non-limiting factors, carrier modulation periods will be longer than backscatter modulation periods. Therefore, the minimum charge delivery rate can be established assuming the carrier modulation period is the longest duration that energy storage will cease.

To model the charge delivery rate, that is, the rate that charge is delivered to the storage capacitor, $C_p$, note that the energy consumed over a bit period must be equal to the energy delivered during the minimum time period that the RF carrier signal is available to deliver energy to the charge storage capacitor. The energy consumed per bit period is derived as follows:

$$\int_0^{t_{bit}} i_c dt = C_p \int_{V_L}^{V_p} dv_p \Rightarrow \int_0^{t_{bit}} v_p i_c dt = \qquad \text{Eq. 4}$$
$$C_p \int_{V_L}^{V_p} v_p dv_p \Rightarrow P_c t_{bit} = \frac{1}{2} C_p (V_p^2 - V_L^2)$$

The power regulation system incorporates hysteresis, the difference between the upper and lower threshold voltage. The regulator 312 begins to supply power to the IC logic once the voltage across the storage capacitor, $C_p$, reaches an upper threshold $V_p$ and suspends regulation when the voltage falls below a second threshold, $V_L$. Including the regulator efficiency from Eq. 3, and rearranging Eq. 4 to solve for the size of the charge storage capacitor, $C_p$, yields:

$$C_p = \frac{2 P_a t_{bit}}{\eta_c (V_p^2 - V_L^2)} \qquad \text{Eq. 5}$$

Substituting the hysteresis window size $\delta_w$ ($\delta_w = V_P - V_L$) into this expression yields:

$$C_p = \frac{2 P_a t_{bit}}{\eta_c (V_L^2 + 2 V_L \delta_w + \delta_w^2 - V_L^2)} = \frac{2 P_a t_{bit}}{\eta_c \delta_w (2 V_L + \delta_w)} \qquad \text{Eq. 6}$$

The current through the capacitor is:

$$i_c = C_p \frac{dv_p}{dt} \qquad \text{Eq. 7}$$

During the AM recovery period the RF carrier must deliver enough energy to sustain logic power consumption throughout the carrier recovery period and to accumulate enough charge to sustain AM modulation during the next cycle when the RF carrier is suspended. Therefore, the rectifier 310 must deliver an average current $I_C$ that will charge the specified storage capacitor, $C_p$, from its lower threshold voltage $V_L$ to its final activation voltage $V_p$. The average current can be found by integrating both sides of Eq. 7.

$$\int_{t_{AM}}^{t_{bit}} i_c dt = C_p \int_{V_L}^{V_P} dv_p \qquad \text{Eq. 8}$$

After evaluating the integral and substituting the expression for capacitance, (Eq. 5) the result is:

$$I_c = \frac{C_p(V_p - V_L)}{t_{bit} - t_{AM}} = \frac{2P_a}{\eta_c} \frac{t_{bit}}{t_{rec}} \frac{1}{(V_p + V_L)} \qquad \text{Eq. 9}$$

This average current is established once the RF carrier returns to charge the energy storage capacitor and requires an average bias voltage across the semiconductor rectifier junction, $V_d$, of:

$$V_d = nV_T \ln\left(\frac{I_c}{I_o}\right) \qquad \text{Eq. 10}$$

Therefore, at the end of each bit period, the RFID tag's antenna 302 will be supplying a final voltage across the IC 308 of:

$$V_b = V_d + V_p \qquad \text{Eq. 11}$$

Note that although the voltages and currents are RMS voltages and currents, the rectifier 310 produces sinusoidal voltage ramps and discontinuous current waveforms each quarter cycle of the RF carrier. RMS voltages and currents are preferred over instantaneous values because they simplify the analysis and provide the same insight into the RFID tag's overall operation. Substituting the expressions from Eq. 9 and Eq. 10 into Eq. 11 gives, $$V_b = V_p + nV_T \ln\left(\frac{2P_a}{\eta_c I_o} \frac{t_{bit}}{t_{rec}} \frac{1}{(V_p + V_L)}\right) \qquad \text{Eq. 12}$$

At the end of the charging cycle, the rectification and energy storage circuitry will be consuming power equal to:

$$P_d = \frac{V_b I_c}{\eta_r} \qquad \text{Eq. 13}$$

Substituting expressions for $V_b$ and $I_c$ from Eq. 9 and Eq. 12 respectively into Eq. 13 yields the maximum power that the IC 308 consumes at the end of the charging cycle (this is power consumed by the IC 308 only and does not include the antenna and matching circuit), $$P_d = P_{IC} \qquad \text{Eq. 14}$$
$$= \frac{2P_a}{\eta_r \eta_c} \frac{t_{bit}}{t_{rec}} \frac{1}{(V_p + V_L)} \left[V_p + nV_T \ln\left(\frac{2P_a}{\eta_c I_o} \frac{t_{bit}}{t_{rec}} \frac{1}{(V_p + V_L)}\right)\right]$$

Incorporating the hysteresis window size, $\delta_w$ ($\delta_w = V_p - V_L$), into this expression yields:

$$P_d = P_{IC} \qquad \text{Eq. 15}$$
$$= \frac{2P_a}{\eta_r \eta_c} \frac{t_{bit}}{t_{rec}} \frac{1}{(2V_L + \delta_w)} \left[V_L + \delta_w + nV_T \ln\left(\frac{2P_a}{\eta_c I_o} \frac{t_{bit}}{t_{rec}} \frac{1}{(2V_L + \delta_w)}\right)\right]$$

in terms of the lower threshold voltage $V_L$ and hysteresis window size, $\delta_w$, since these are the independent parameters. Also, from Eq. 15 it can be seen that the IC power consumption decreases as the lower threshold voltage or hysteresis window size increase (note that $V_L$ and $\delta_w$ are in the denominators of Eq. 15, so an increase in $V_L$ or $\delta_w$ will decrease the right hand side of Eq. 15). Taking the increase in threshold voltage, $V_L$, or hysteresis window size, $\delta_w$, to the limit is equivalent to setting the storage capacitance, $C_p$, to zero. In doing so, it can be seen that power will be delivered at the rate that the logic consumes it, moderated by efficiency factors and the carrier duty cycle. That is, $$P_{IC}\Big|_{\lim V_L \to \infty} = \frac{P_a}{\eta_r \eta_c} \frac{t_{bit}}{t_{rec}} \qquad \text{Eq. 16}$$
$$= \frac{P_a}{\eta_r \eta_c} \frac{1}{\tau_D}$$
$$= \frac{P_a}{\eta_r \eta_c} \frac{1}{1 - R_{bit} t_{AM}}$$
$$= P_{co}$$

Where $P_{co}$, is the minimum required energy storage rate and the interrogation bit rate, $R_{bit}$, (also known as the data rate) can be defined as:

$$R_{bit} = \frac{1}{t_{bit}} \qquad \text{Eq. 17}$$

This relationship allows the bit rate, $R_{bit}$, as an independent variable in future equations.

If the RF carrier does not modulate or alternatively, the duty cycle is unity, then the IC consumes power at exactly the rate that it is consumed by the logic circuit, moderated by the rectifier and regulator efficiency factors. Simplify the expression for the integrated circuit power consumption yields:

$$P_{IC} = \frac{2P_{co}(V_L + \delta_w)}{(2V_L + \delta_w)} + \frac{2P_{co}}{(2V_L + \delta_w)} nV_T \ln\left(\frac{\eta_r}{I_o} \frac{2P_{co}}{(2V_L + \delta_w)}\right) \qquad \text{Eq. 18}$$

From this expression, two power dissipation components can be identified. The first term is the charge storage rate and the second term is the power dissipation across the non-linear rectifier.

For narrow bandwidth systems, the antenna and associated impedance matching sub-system can be modeled as a lumped parallel RLC network 306 as shown in FIG. 3. This network has a Q-factor of $$Q = R_m \sqrt{\frac{C_a}{L_a}} \qquad \text{Eq. 19}$$

Where the power dissipative elements can be lumped into an equivalent resistance, $R_m$, the antenna inductance, $L_a$, and antenna capacitance, $C_a$. The power dissipated in this antenna and matching network, $P_m$, is due only to the resistive portion such that:

$$P_m = \frac{V_b^2}{R_m} = \frac{V_b^2}{Q\sqrt{\frac{L_a}{C_a}}} \qquad \text{Eq. 20}$$

Therefore, systems with a higher Q-factor value will dissipate less energy. For higher bandwidth systems, the power dissipative elements can be lumped into an equivalent resistance $R_m$. Substituting the IC supply voltage, $V_b$, from Eq. 12 yields:

$$P_m = \frac{\left[V_L + \delta_w + nV_T \ln\left(\frac{\eta_r}{I_o}\frac{2P_{co}}{(2V_L+\delta_w)}\right)\right]^2}{Q\sqrt{\frac{L_a}{C_a}}} \qquad \text{Eq. 21}$$

The bandwidth, BW, required to reliably transmit a pulse of duration equal to the bit modulation period is:

$$BW = \frac{1}{t_{AM}} = \frac{f_o}{Q} \qquad \text{Eq. 22}$$

Where, $f_o$, is the frequency of the RF carrier.

Therefore, the Q-factor in terms of the independent variable, $t_{AM}$, (bit modulation period) is:

$$Q = f_o t_{AM} \qquad \text{Eq. 23}$$

The antenna inductance, $L_a$, and capacitance, $C_a$, ratio can be rewritten as:

$$\sqrt{\frac{C_a}{L_a}} = 2\pi f_o C_a \qquad \text{Eq. 24}$$

Therefore, $$Q\sqrt{\frac{L_a}{C_a}} = \frac{f_o t_{AM}}{\sqrt{\frac{C_a}{L_a}}} = \frac{f_o t_{AM}}{2\pi f_o C_a} = \frac{t_{AM}}{2\pi C_a} \qquad \text{Eq. 25}$$

Substituting Eq. 25 into Eq. 21 yields:

$$P_m = \left[V_L + \delta_w + nV_T \ln\left(\frac{\eta_r}{I_o}\frac{2P_{co}}{(2V_L+\delta_w)}\right)\right]^2 \frac{2\pi C_a}{t_{AM}} \qquad \text{Eq. 26}$$

Unlike the IC power dissipation, $P_{IC}$, the power dissipation in the antenna 302 and matching circuit 304 ($P_M$) increases with activation voltage. This phenomenon suggests the existence of an optimum activation threshold. The upper and lower operational voltage thresholds are usually a circuit design parameter for a given particular semiconductor process.

Eq. 26 also demonstrates a trade-off between antenna power dissipation and detuning sensitivity. It is preferred that the lumped antenna capacitance, $C_a$, be much greater than that of the parasitic capacitive coupling due to the antenna's proximity with other objects in the environment. This parasitic coupling will limit the antenna's resonant frequency variation as parasitic coupling distances reduce. However, increasing the antenna capacitance, $C_a$, will increase the antenna's power dissipation $P_m$ and subsequently decrease the interrogation distance. To compensate the bit modulation period, $t_{AM}$, can be increased. From Eq. 16, increasing the bit modulation without also reducing the bit rate will increase the required energy delivery rate $P_{co}$, and subsequently decrease the interrogation distance as well. However, less power will be dissipated in the antenna and the power transfer efficiency will improve. Therefore, unlike active RFID tags, passive RFID tag operation will be more robust at lower rather than higher bit rates. Detuning sensitivity can be decreased by increasing the antenna lumped capacitance, and increasing the bit modulation period while lowering the bit rate, without losing range.

The power delivered to the rectification and charge storage circuitry, $P_d$, is equal to the power collected from the antenna 302 less the power lost in the matching circuit 304. That is, $$P_d = P_r - P_m \qquad \text{Eq. 27}$$

Substituting the expressions for $P_d$ from Eq. 15, $P_r$ from Eq. 1 and $P_m$ from Eq. 26 into equation Eq. 27 and solving for the range, r, yields:

$$r_{max} = \frac{\lambda}{4\pi}\sqrt{P_s \psi_r} \left( \frac{2P_{co}(V_L+\delta_w)}{(2V_L+\delta_w)} + \frac{2P_{co}}{(2V_L+\delta_w)} nV_T \ln\left(\frac{\eta_r}{I_o}\frac{2P_{co}}{(2V_L+\delta_w)}\right) + \frac{\left[V_L+\delta_w+nV_T\ln\left(\frac{\eta_r}{I_o}\frac{2P_{co}}{(2V_L+\delta_w)}\right)\right]^2}{\frac{t_{AM}}{2\pi C_a}} \right)^{-\frac{1}{2}} \qquad \text{Eq. 28}$$

Thus, the powering distance depends on the power dissipation in the various circuit sub-systems such as the IC logic, the non-linear voltage rectifier, the antenna, and its associated matching circuit. In addition, the power dissipation in each sub-system is also scaled by the required rate of energy accumulation. This is expected as the nonlinear rectification circuit, for example, will dissipate more power as the storage current increases.

For typical design parameters, Equation 28 can be simplified. The rectifier junction is weakly biased at the maximum interrogation distance such that $$(V_L + \delta_w) \gg nV_T \ln\left(\frac{\eta_r}{I_o}\frac{2P_{co}}{(2V_L+\delta_w)}\right) \qquad \text{Eq. 29}$$

For example, in an exemplary embodiment, $$(V_L + \delta_w) \approx 2 \text{ volts} \quad \text{Eq. 30}$$

and $$nV_T \ln\left(\frac{\eta_r}{I_o} \frac{2P_{co}}{(2V_L + \delta_w)}\right) \approx 75 \text{ mV} \quad \text{Eq. 31}$$

at the maximum interrogation distance, which is about 20 feet for a typical low cost chip that consumes about 50 microwatts. This approximation results in approximately 2% error at the maximum range but the expression for maximum range can be simplified:

$$r_{max} \cong \frac{\lambda}{4\pi} \sqrt{P_s \psi_r} \left(2P_{co} \frac{(V_L + \delta_w)}{(2V_L + \delta_w)} + \frac{2\pi C_a}{t_{AM}}(V_L + \delta_w)^2\right)^{-\frac{1}{2}} \quad \text{Eq. 32}$$

substituting for $P_{co}$ from Eq. 16 clarifies the maximum rate's dependency on the AM modulation period, $t_{AM}$, where:

$$r_{max} \cong \quad \text{Eq. 33}$$

$$\frac{\lambda}{4\pi} \sqrt{P_s \psi_r} \left(\frac{2P_a}{\eta_r \eta_c} \frac{1}{(1 - R_{bit} t_{AM})} \frac{(V_L + \delta_w)}{(2V_L + \delta_w)} + \frac{2\pi C_a}{t_{AM}}(V_L + \delta_w)^2\right)^{-\frac{1}{2}}$$

The maximum possible range under ideal circumstances of zero hysteresis window, zero carrier modulation period, and 100% rectification and regulation efficiencies can be calculated. Setting $\delta_w = 0$, and the efficiency factors to unity yields:

$$r_{ideal} = r_{max}\big|_{\delta_w \to 0} \quad \text{Eq. 34}$$

$$= \frac{\lambda}{4\pi} \sqrt{P_s \psi_r} \left(\frac{P_a}{(1 - R_{bit} t_{AM})} + V_L^2 \frac{2\pi C_a}{t_{AM}}\right)^{-\frac{1}{2}}$$

From Eq. 20 the antenna capacitance, $C_a$, approaches zero as its power dissipation approaches zero. Therefore, for a loss-less antenna, the second term can be set to zero. For zero carrier modulation, $t_{AM}$ can be set to 0 and the final expression for maximum range under ideal conditions is:

$$r_{ideal} = r_{max}\big|_{\substack{\delta_w \to 0 \\ t_{AM} \to 0}} = \frac{\lambda}{4\pi} \sqrt{\frac{P_s}{P_a} \psi_r} \quad \text{Eq. 35}$$

The derivation of the maximum range expression (Eq. 24 and 33) shows that the collected power is distributed between losses in the antenna and matching circuitry, losses across the power rectifier, and power that the voltage regulator and digital logic consumes. For typical designs, numerical evaluation shows that, depending on the data rate, the digital logic consumes between 30% and 70% of the total collected power while the antenna and rectifier dissipate the rest. When utilized, as a clamping diode, Schottky diodes will account for about 5% of the power dissipation because of their characteristically low threshold voltages.

The power dissipation in the antenna and matching circuitry increases with activation threshold voltage $V_p$ or [$V_L + \delta_w$] while that of the rectifier and charge storage circuitry decreases. The specific transistor topology and bias currents of the regulator's analog circuit design establishes the minimum operating voltage threshold.

Powering range is strongly dependent on the resistive losses and, therefore, the Q-factor of the impedance matching circuit. Consequently Q-enhancement will provide significant increases in powering distance but at the cost of bandwidth reduction. This fact can be used to produce passive dual-frequency RFID tags which receive remote power via narrow band UHF frequencies, but communicate either via low power active or backscatter transmission within the industrial, scientific and medical (ISM) bands such as 2.45 GHz or 5.6 GHz. Using a dual frequency RFID tag provides an opportunity to substantially enhance the Q-factor of the power receiving UHF circuitry, and hence the powering range without sacrificing the RFID tag's communication bandwidth.

The power dissipation of the impedance matching circuit is directly proportional to the sum of its distributed capacitance (lumped model.) That is, smaller antenna capacitance will result in greater interrogation range. However, smaller antenna capacitances also result in greater detuning sensitivity whereby the antenna's resonance frequency shifts away from the carrier frequency. To reduce detuning sensitivity, the parasitic capacitances produced by coupling with nearby objects should be orders of magnitude smaller than the distributed antenna capacitance.

The maximum distance that a passive RFID tag can be activated or the powering range is linearly dependent on the carrier wavelength. This strong dependency on wavelength is the main reason for the popularity of UHF frequency bands relative to the shorter wavelength ISM bands such as 2.5 GHz and 5.8 GHz.

When optimized, maximum power is transferred from the antenna subsystem to the integrated digital logic. Therefore, an optimized design minimizes the power dissipated across the antenna and rectification junction and maximizes the power transferred to the digital logic. This involves maximizing the power transfer via antenna and load impedance matching, and minimizing the turn-on voltage and the leakage current in the rectification junction. The power transfer efficiency to the digital logic is the ratio of the average logic power consumption to the power received at the maximum interrogation distance. From Eq. 1:

$$\eta_{logic} = \left(\frac{4\pi r_{max}}{\lambda}\right)^2 \frac{1}{\psi_r} \frac{P_a}{P_s} \quad \text{Eq. 36}$$

This value typically ranges from 30% to 70% at the maximum read range for an optimized design, depending on the cost and data rate selection. However, the efficiency may increase as tag designs change.

Multiple RFID tags in the field initialize at different times depending on the received power in that location. RFID tags initialize once the charge storage capacitor accumulates sufficient energy to exceed the minimum operating voltage threshold by an amount equal to the voltage hysteresis window $\delta_w$. The amount of power received by a RFID tag decreases as distance from the interrogator increases. Therefore, RFID tags at the maximum reading distance receive the least amount of power and are the last ones to initialize. The longest initialization period can be derived from:

$$\int_0^{t_{init}} i_c dt = C_p \int_0^{V_P} dv_p \Rightarrow t_{init} = \frac{C_p V_p}{I_c} \qquad \text{Eq. 37}$$

Substituting $I_c$ from Eq. 9, $$t_{init} = (t_{bit} - t_{AM}) \frac{V_p}{V_p - V_L} = \left( \frac{1}{R_{bit}} - t_{AM} \right) \left( 1 + \frac{V_L}{\delta_w} \right) \qquad \text{Eq. 38}$$

By setting $V_L=0$, the initialization period is identical to the AM recovery period. That is, $V_L=0$ represents no charge overhead to establish a minimum operating voltage.

Anti-collision algorithms currently do not rely on this inherent spatial diversity. Instead, most algorithms wait a predetermined amount of time in order to ensure that all the RFID tags in the field are first initialized before beginning the interrogation cycle. This additional amount of initialization time is usually a substantial portion of the total interrogation time for typical RFID tag population densities, n, where the interrogation time is proportional to n log(n). Therefore, the protocol speed may be improved by incorporating this inherent spatial diversity along with intelligent transmit power control (TPC) algorithms. TPC algorithms are known in the art and currently are employed in popular wireless wide area network systems, and standards are emerging for similar mechanisms to be incorporated into wireless local area network systems.

The efficiency of an RFID tag is also dependent on the semiconductor fabrication technology. Semiconductor fabrication technologies typically change significantly every 18 months or so. At some point, mature technologies cost the least and older technologies again begin to increase in cost due to obsolescence. Some analog dominant designs provide better performance on much older, and larger feature size technologies, and this is why they still exist in order to serve a niche market. Newer fabrication technologies are generally more power efficient because of the smaller feature sizes but are more expensive per unit area because of the early tooling investment and initial low yields. Therefore, typically, two-year-old technologies tend to be the most cost effective for passive RFID tag chip fabrication because they are mature, have the least cost overhead, and are widely available.

Passive RFID tags typically incorporate a relatively simple state machine logic that consists of less then 25 thousand gates. The charge storage capacitor is usually integrated into the silicon in order to reduce the overall RFID tag assembly cost. The storage capacitor typically dominates the RFID tag's die area. The total die area per RFID tag can be calculated as:

$$A_D = \frac{C_p}{D_c} + A_G N_G \qquad \text{Eq. 39}$$

Given an average cost per silicon area $\zeta$, the total chip cost is, $$\text{Cost} = A_D \zeta \qquad \text{Eq. 40}$$

In order to set the cost as an independent variable for analysis, Eq. 6 is solved for hysteresis in terms of the capacitance. Solving equation Eq. 6 for $\delta_w$ and taking the positive solution gives, $$\delta_w = \sqrt{V_L^2 + \frac{2P_a}{\eta_c R_{bit} C_p}} - V_L \qquad \text{Eq. 41}$$

Eq. 39 and Eq. 40 can be combined and solved for $C_p$. The result can be substituted into Eq. 41 to yield the hysteresis voltage as a function of cost, $$\delta_w = \sqrt{V_L^2 + \frac{2P_a}{\eta_c R_{bit}} \frac{\zeta}{D_c(\text{Cost} - \zeta A_G N_G)}} - V_L \qquad \text{Eq. 42}$$

Eq. 42 allows for the calculation of the maximum interrogation distance as a function of cost. The graph in FIG. 5a shows that for a typical design and a minimum cost target, there exists an optimum (minimum) operating voltage threshold. Each curve in FIG. 5a shows the range versus minimum operating voltage for a given cost. The graph of FIG. 5b illustrates the range of RFID tag versus the cost of the tag for various minimum operating voltages. For example, curve 510 shows the range versus cost for a 3 volt minimum. Curve 512, wave 514 and wave 516 represent range versus cost for 2, 1 and 0.5 volts, respectively. As seen in FIG. 5b, as cost increases beyond about 5 cents, the range does not change significantly.

The interrogation distance or range is strongly dependent on almost all of the requirements. This is intuitive because the main objective of passive RFID tag design is to achieve maximum power transfer efficiency, therefore, maximum range while providing the desired combination of maximum data rate, minimum cost, and minimum detuning sensitivity from parasitic coupling with objects in the environment. Maximum power transfer efficiency or range is often desirable. Heavy multi-path signaling and capacitive coupling with metallic and plastic objects significantly impede energy collection. Maximum range translates directly to maximum sensitivity, which greatly improves the chances of communicating with the RFID tag under difficult signal propagation conditions. Therefore, by selecting the minimum desired range, the boundaries of the remaining parameter spaces, including the maximum achievable data rate, the minimum achievable cost, and the minimum achievable detuning sensitivity, can be established.

Figure 1:
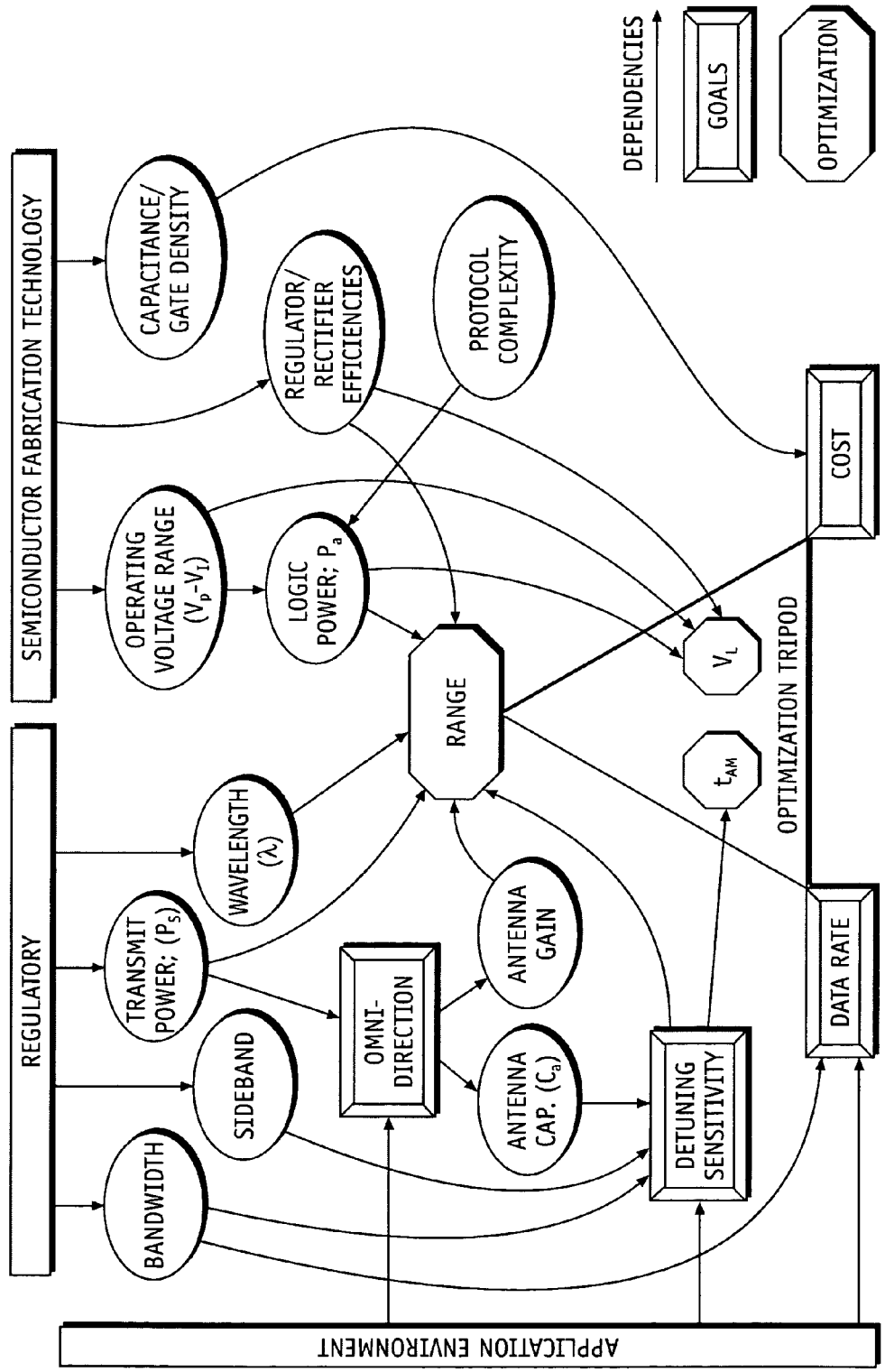
FIG. 1 illustrates parameters of a RFID tag and their dependencies.

FIGS. 6a-6c shows the trade-off between range, cost, and data rate for various ranges of acceptable detuning sensitivity and selection between the two most widely available and cost effective semiconductor fabrication processes as of this writing. The semiconductor processes are selected such that the desired minimum operating voltage threshold, $V_L$, can be achieved at the least possible cost. The parameters from FIG. 1 are used for the 0.35-micron and 0.25-micron processes in the calculations.

FIG. 6a illustrates the range versus transmission data rate for a modulation period of 5 µs (high detuning sensitivity) for a 0.28 micron process system (604) and 0.35 micron process system (602). FIG. 6b illustrates the range versus transmission data rate for a modulation period of 2 µs medium detuning sensitivity) for a 0.25 micron process system (608) and a 0.35 micron process system (606). FIG. 6c illustrates the range versus transmission data rate for a modulation period of 0.5 µs (low detuning sensitivity) for a 0.25 micron process system (612) and a 0.35 micron process system (610). Each of these graphs includes a number of curves that represent different costs for the tag. As can be seen, for each curve on each graph 602-612, there is a peak range for some given data rate.

The migration from one process to the next includes the logic power, $P_a$, scaling due to the change in minimum power supply voltage. The migration from one process to the next also accounts for the change in average gate size, capacitance density, and cost per unit area of the silicon design.

Given a desired range, data rate, and cost objective, the carrier modulation pulse width, $t_{AM}$, can be adjusted within regulatory constraints, and the minimum operating voltage, $V_L$, can be adjusted within the semiconductor fabrication constraints to change the location of the optimum operating points. The optimum operating point is the point of maximum power transfer to the RFID tag's digital logic. Changing the carrier modulation pulse width involves trading off at least one of the optimization objectives such as range, data rate, or cost for less detuning sensitivity. For example, as the modulation period lengthens, the RFID tag's receiver bandwidth decreases, which in turn reduces the antenna's resistive losses for each composite resonant frequency. This increases the RFID tag's range because more power is available for the digital logic. However, the reduced bandwidth or enhanced Q-factor increases the antenna's sensitivity to detuning from capacitive coupling with nearby objects. Antenna detuning results in significant range degradation. Instead the bit modulation period can be increased while reducing the bit rate by an equal amount so that the antenna capacitance, $C_a$, can increase without decreasing the interrogation range.

Figure 7:
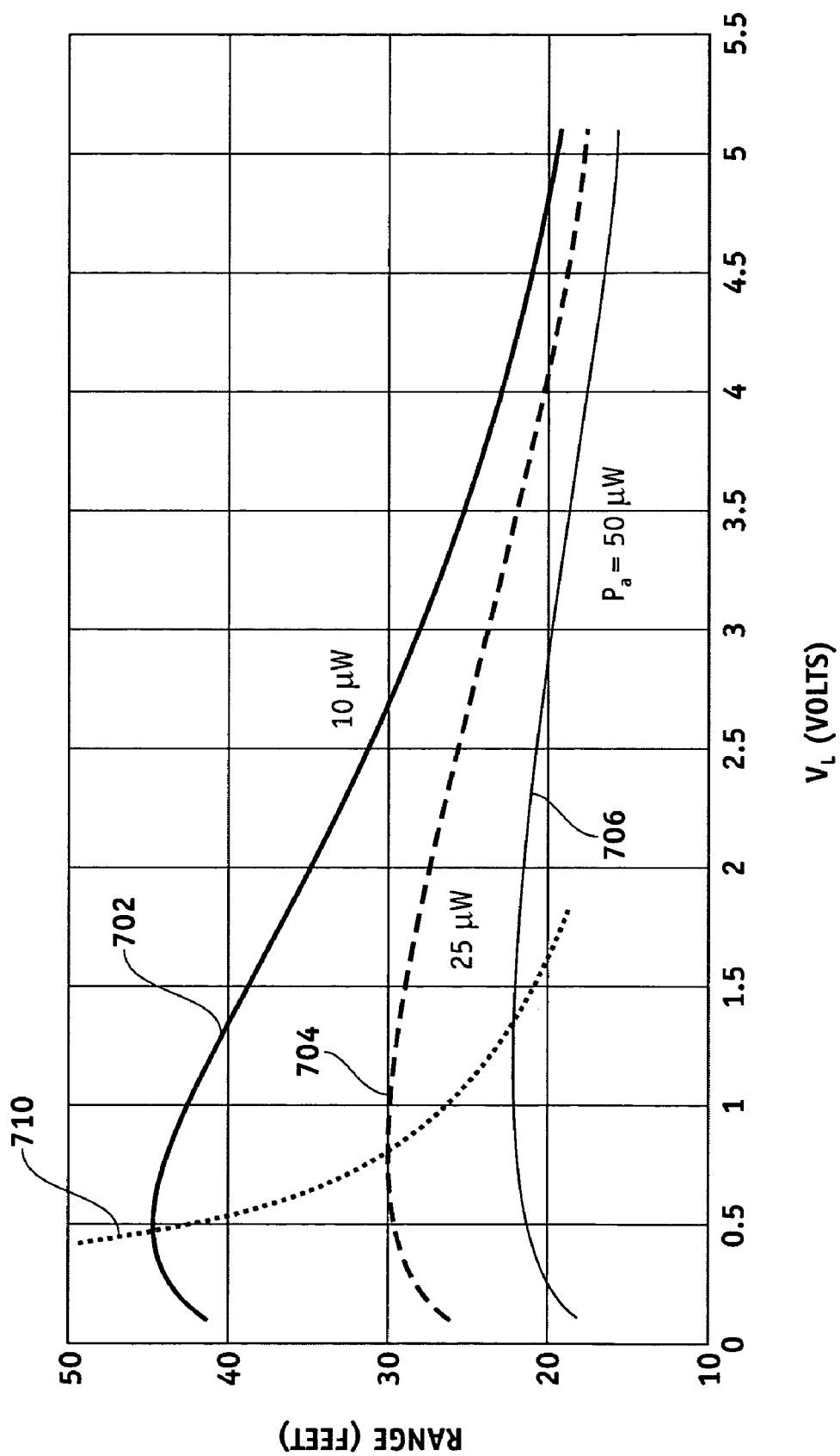
FIG. 7 shows a graph illustrating the relationship between integrated circuit power requirement and power supply voltage requirement.

The semiconductor process establishes the minimum logic power consumption per gate, the capacitance and gate area density, and the acceptable range of gate operating voltages. The process technology also determines the designer's ability to integrate high-Q inductors for high efficiency regulators and low leakage, low voltage threshold PN junctions for high efficiency rectifiers. Logic power consumption, regulator, and rectifier efficiencies strongly constrain the optimum operating voltage threshold, $V_L$. FIG. 7 illustrates the range of a RFID tag, for a range of minimum voltage. In FIG. 7, there are three curves, each curve representing a different logic power consumption level. As can be seen each curve has a peak range at a given operating voltage. As seen in FIG. 7, the peak shifts to the left as the power consumption decreases. Therefore, as the logic power consumption decreases, the minimum operating voltage decreases.

Once the semiconductor process is selected, the operating voltage boundaries, the average logic power consumption, the regulator efficiency, the rectifier efficiency, and the capacitance per unit silicon area are known. The minimum and maximum operating voltages historically decline as fabrication technologies move to smaller transistors. The average logic power consumption also declines with the square of the supply voltage, $$P_a \propto C_o V_s^2 f_{clk} \qquad \text{Eq. 43}$$

Substantial range improvement for passive RFID tags can be expected as fabrication technologies continue to produce smaller, and more power efficient, low-voltage transistors. As an example, the table below shows the expected power supply scaling with semiconductor process geometry.

|  | Semiconductor Fabrication Technology | | | |
| --- | --- | --- | --- | --- |
| Min. Feature Size [µm] | 0.35 | 0.25 | 0.18 | 0.13 |
| Power Supply [Volts] | 3.3 | 2.5 | 1.8 | 1.2 |

Regulator efficiencies also continue to improve as designers utilize more advanced technologies such as micro-electromechanical (MEM) structures to improve the efficiencies of switches and inductors. Rectifiers are currently implemented with Schottky diodes serving as the main non-linear rectification junction. Schottky diodes have characteristically lower turn-on voltages but higher leakage currents than other traditional semiconductor diodes. As designs incorporate diode connected CMOS transistors or MEM switches, further efficiency improvements will be made. The expected trend is towards slightly higher capacitance per unit silicon area as the oxide thickness decrease with transistor scaling. The charge storage capacitor typically occupies the largest portion of the chip area, particularly in read-only passive RFID tags. Therefore, cost reduction should occur as semiconductor feature size shrinks.

Over time the costs related to RFID tags should decrease and performance should improve. However, even with these improvements, the designer of RFID tags will be faced with tradeoffs in the selection of parameters to optimize. The existence of tradeoffs are shown in FIG. 1 and illustrated in the derived equations. Using the derived equations, a method can be developed that helps to optimize such important parameters as range, data rate and costs while constrained by minimum detuning sensitivity and the range of semiconductor operating voltages.

Figure 10:
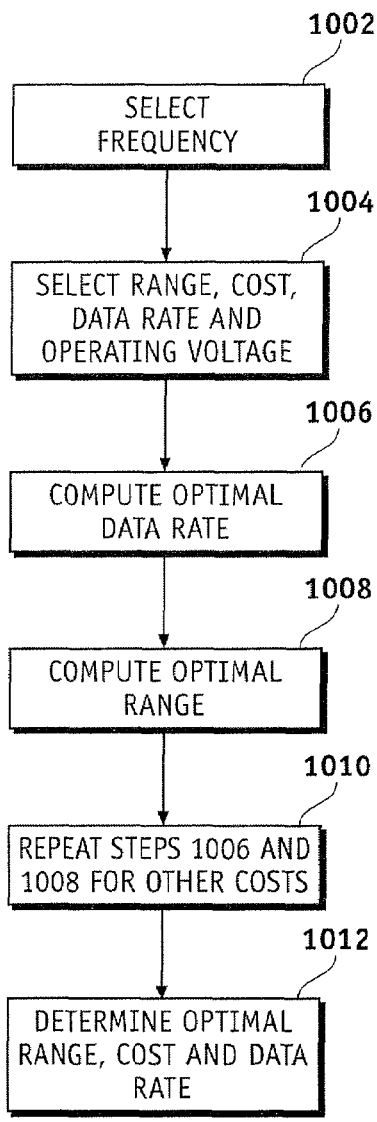
FIG. 10 shows a flowchart illustrating an exemplary method for optimizing the design of RFID tags in accordance with the teachings of the present invention.

FIG. 10 shows a flowchart illustrating an exemplary method for optimizing the design of RFID tags in accordance with the teachings of the present invention. As is known to one of skill in the art, the optimization method can be run on any general purpose or specialized computing device, using any known operating system and any suitable computer language. In a first step 1002, the frequency band in which the RFID tag and RFID reader will operate is selected. For example, in an exemplary embodiment, an ultra-high frequency (UHF) range of 850-900 MHz can be chosen. UHF frequency RFID systems typically can have a greater range and higher data rate than low frequency systems. Once the frequency range is chosen, any regulatory constraint for the chosen frequency band needs to be applied. These constraints can help establish a maximum bandwidth, a maximum transmit power, an RF carrier to side-band ratio, and antenna omni-directionality.

Next, in step 1004, the acceptable minimum range, the acceptable maximum cost, the acceptable minimum data rate and a minimum operating voltage are chosen. The choice of these values is typically left to the designer and is based on the needs of the application and in light of available technologies. The acceptable minimum range is, typically, an acceptable minimal maximum range, or, in other words, the smallest maximum range desired.

Figure 11:
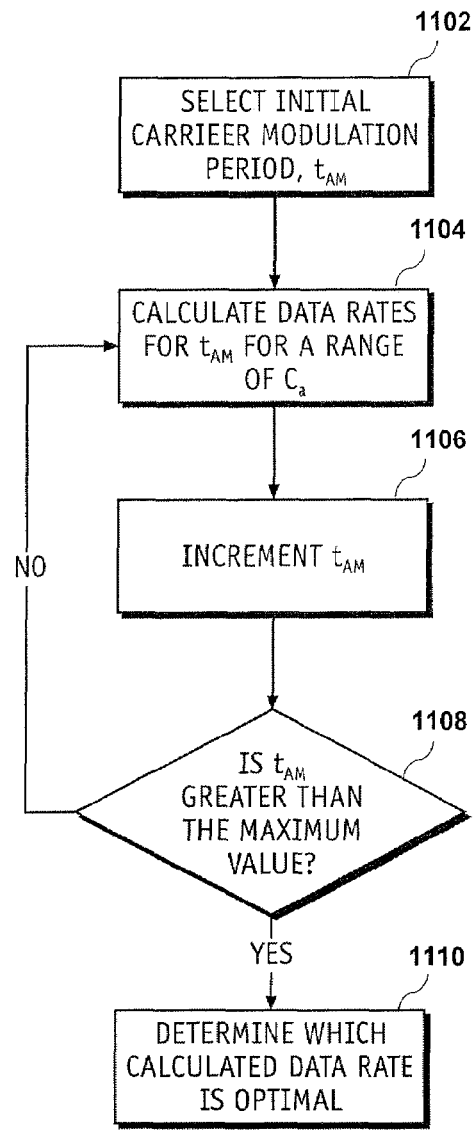
FIG. 11 shows a flowchart illustrating an exemplary method for calculating an optimal data rate.

In step 1006, using the acceptable fixed minimum range as a constant, an optimal data rate near the desired data rate is found using Eqs. 33 and 42. An exemplary process of finding the optimal data rate is illustrated in FIG. 11. In a first step, 1102, an initial carrier modulation period, $t_{AM}$, is selected. Typically, this will be chosen to be a low carrier modulation period, such that the carrier modulation period can be incremented in future steps. Next, in step 1104, the data rate is calculated for a range of antenna capacitances, $C_a$. The range of antenna capacitances to use will be based on practical antenna capacitances. After this step, there will be a number of data rates that occur at a certain carrier modulation period and antenna capacitance. In step 1106, the carrier modulation period is incremented. In step 1108, the current carrier modulation value is checked to see if the value is larger than the maximum carrier modulation value that the designer wishes to consider. If not, the process goes back to 1104 where more data rates are calculated using the current modulation value and varying antenna capacitance. If the maximum carrier modulation period has been used, then, in step 1110 the optimal data rate, which, in one embodiment is the data rate closest to the desired data rate, is selected from all the calculated data rates. That data rate and the associated carrier modulation period, $t_{AM}$, and the antenna capacitance, $C_a$, will then be saved for use in the method of FIG. 10.

Returning to FIG. 10, in step 1008, using Eq. 33 and 42, and the carrier modulation period, $t_{AM}$, the data rate, Rbit, and the antenna capacitance, $C_a$, values from step 1006, a series of range values are calculated for a range of minimum operating voltages, $V_L$, in order to find a maximum range. At the end of this step, an optimal range and data rate will have been found for a certain cost.

In step 1010, steps 1006 and 1008 are repeated for different cost points and/or other constraint values. When this is completed, in step 1012, all of the determined optimal range, data rate and costs are analyzed to find the best set of values. In one embodiment, this is done using the well known technique of calculating the vector sum of range, cost, and data rate for each of the identified values and then determining which one of the vector sums is at a minimum total vector distance from the desired range, cost and data rate.

Figure 8A:
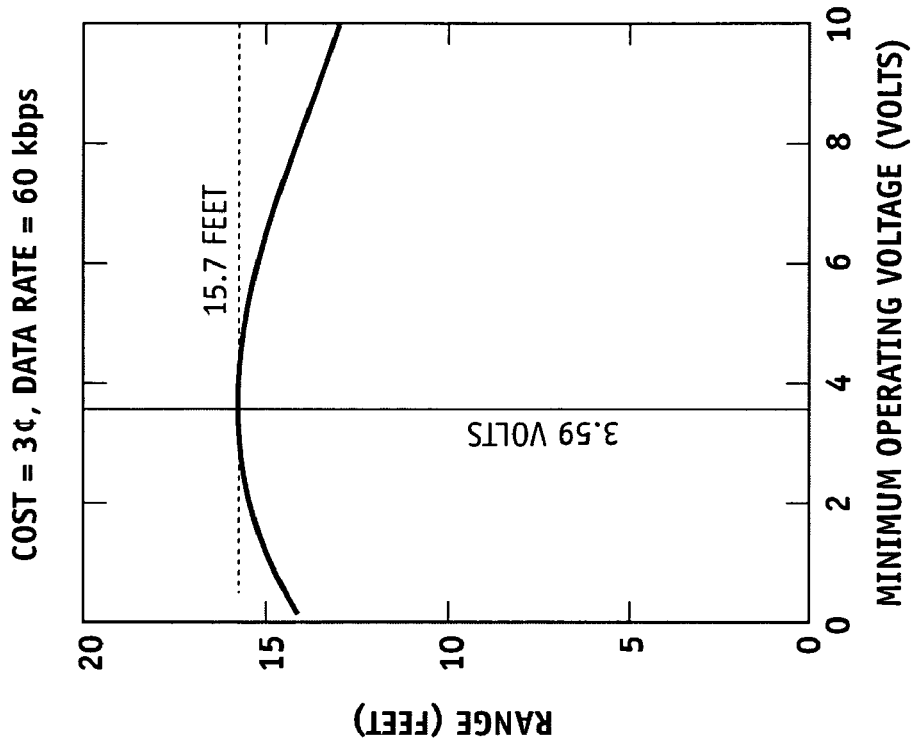
FIG. 8 shows a graph illustrating the relationship between range of the RFID tag and carrier modulation and threshold voltage.
Figure 8B:
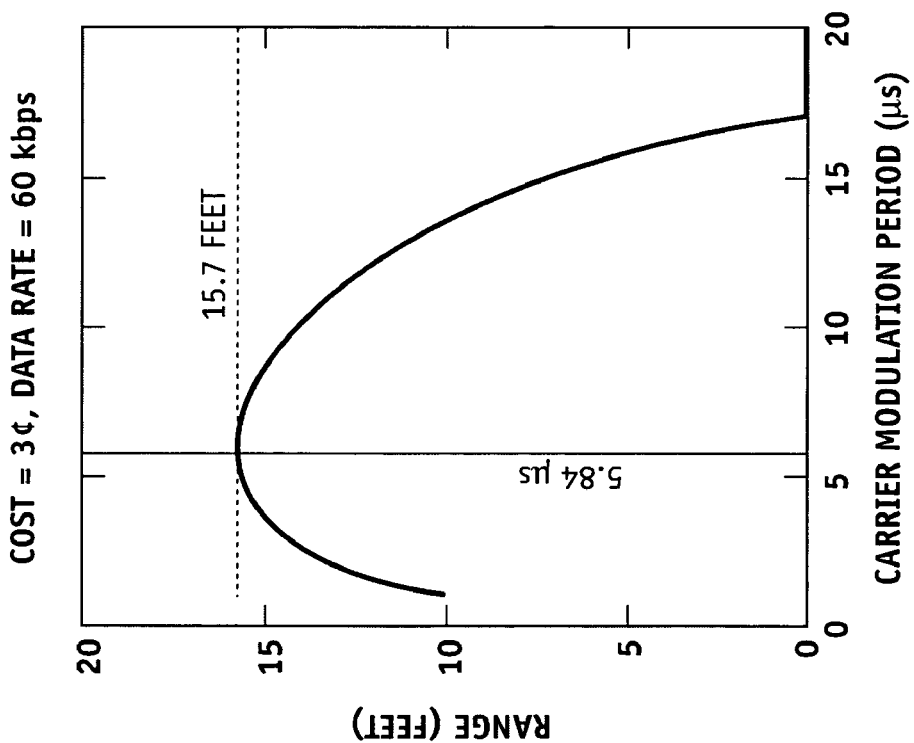

As an example, FIG. 8 illustrates the use of the method. The desired range was initially set to at least 12 feet, the data rate at least 60 kilobits per second, and the die cost at most 5-cents. The optimization algorithm determined that the maximum range of 15.7 feet would occur at a carrier modulation period of 5.8 microseconds and a minimum operating voltage of 3.6 volts. Knowing this, the designer may then choose to adjust these parameters to practical values and verify that the final range will be at least 12 feet for example. For example, a die operator near the operating voltage may be selected. However, the final design with the practical values for $t_{AM}$ and $V_L$ may be somewhat sub-optimal. Nevertheless, the optimization curves allow the designer to determine how far away from the optimum operating point the final implementation will be. As seen in FIG. 8a, the range is plotted against the carrier modulation period, $t_{AM}$, for the example above, using the range equations 33 and 42. The maximum range, 15.7 feet is above the required range and access at 5.84 µs. FIG. 8b illustrates the range versus the minimum operating voltage for the above example. As seen in FIG. 8b, the range of 15.7 feet occurs at 3.59. This verifies the range, data rate and minimum operating voltage discussed above.

Figure 9:
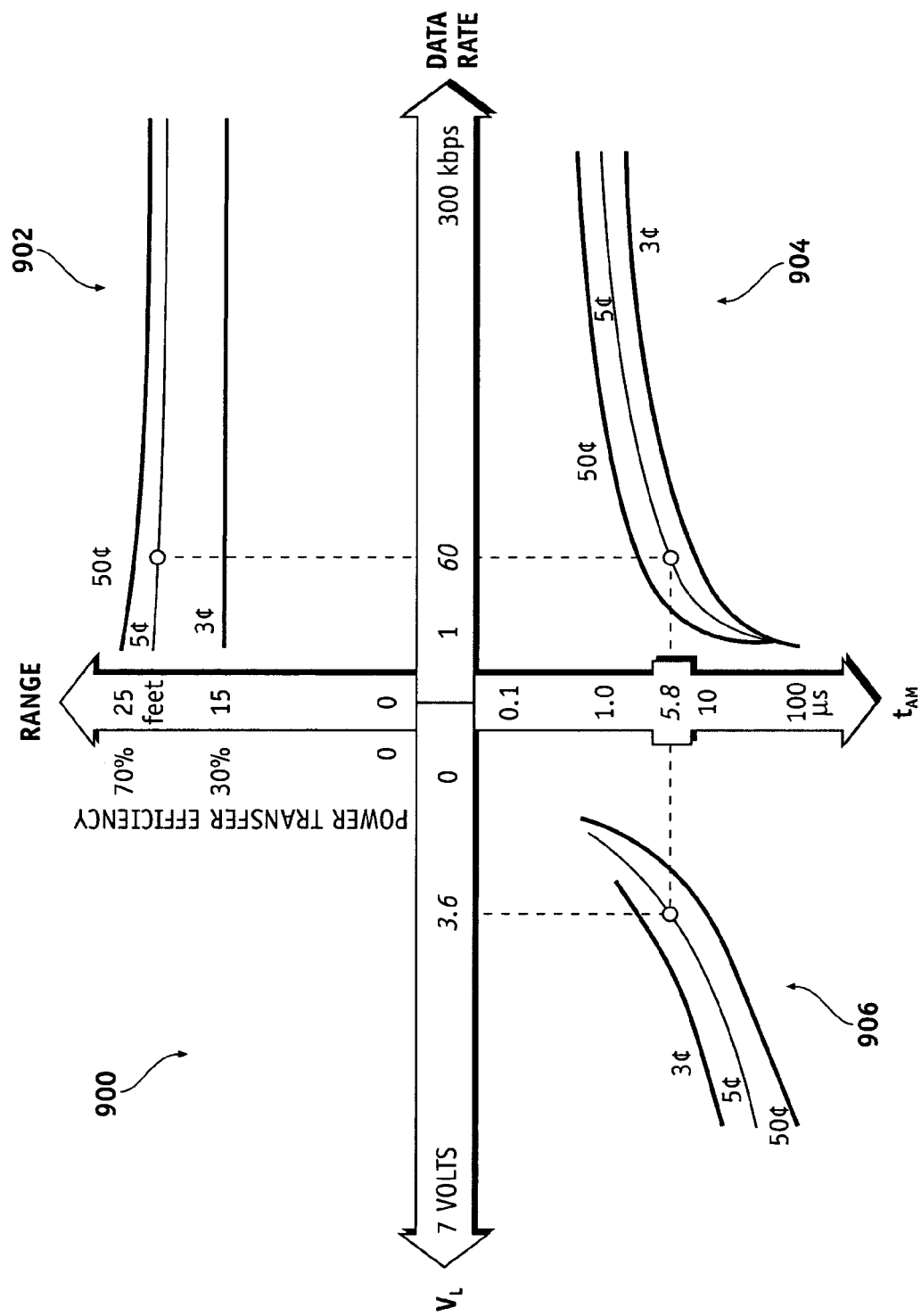
FIG. 9 shows a graph illustrating the optimization process.

Using the optimization algorithm, the graph of FIG. 9, illustrating the required minimum operating voltage and carrier modulation period for various combinations of range, cost, and data rate, can be determined. As seen in FIG. 9, in the first quadrant 902, curves for various costs are graphed that plot range versus data rate. The curves are generated from the range equations using the data rate as an independent variable. In the third quadrant 906, curves for various costs are graphed that plot operating voltage versus modulation period. In the fourth quadrant 904, curves for various costs are graphed that plot modulation period versus data rate. In this quadrant, the data rate is used as an independent variable to determine modulation period. The range is nearly constant at the locus of optimum operating points $\{t_{AM}, V_L\}$, given a desired cost and data rate. The maximum range at the optimum operating point corresponds to maximum power transfer efficiency from the antenna to the digital logic as given in Eq. 36. Intuitively, the maximum power transfer efficiency should be fairly constant at the optimum operating point given a data rate and cost goal.

The optimization cannot guarantee that one or all performance and cost goals will be met within the constraints of regulatory, application environment, and semiconductor fabrication parameter boundaries. It can only determine how close to the desired performance and cost specifications the optimized values can reach. Alternatively, it may be decided that one performance or cost parameter may be traded off for the others and terminate the optimization when that condition is met.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A method for optimizing the design parameters of an RFID tag for use with a RFID reader in a RFID system based on selected design constraints, the method comprising the steps of:
    receiving a first desired frequency band that the RFID tag will operate in;
    receiving a first desired data range between the RFID tag and the RFID reader;
    receiving a first desired cost for the RFID tag;
    receiving a first desired data rate for the RFID tag;
    receiving a first desired operating voltage for the RFID tag;
    receiving a first carrier modulation period of an interrogation signal generated by the RFID reader within a range of carrier modulation periods, wherein the range of carrier modulation periods is constrained by each of the first desired frequency band, the first desired data range, the first desired cost, the first desired data rate, and the first desired operating voltage;
    varying an antenna capacitance of the RFID tag to a desired first capacitance value in conjunction with the first carrier modulation period to generate a first plurality of operating data rates for the RFID tag;
    selecting a first operating data rate of the RFID system, the first operating data rate being the operating data rate of the first plurality of operating data rates nearest to the first desired data rate;
    calculating a first operating data range based on the first desired operating voltage and the first operating data rate; and
    displaying a representation of the first operating data rate and the first operating data range.

2. The method of claim 1, further comprising the steps of:
    receiving at least one of a second desired frequency band, a second desired data range, a second desired cost, a second desired data rate, and a second desired operating voltage;
    receiving a second carrier modulation period of the interrogation signal within the range of carrier modulation periods, wherein the range of carrier modulation periods is constrained by the received first or second desired frequency band, first or second desired data range, first or second desired cost, first or second desired data rate, and first or second desired operating voltage;

varying the antenna capacitance to a desired second capacitance value in conjunction with the second carrier modulation period to generate a second plurality of operating data rates;

selecting a second operating data rate, the second operating data rate being the operating data rate of the second plurality of operating data rates nearest to the second desired data rate;

calculating a second operating data range based on the received first or second desired frequency band, first or second desired data range, first or second desired cost, first or second desired data rate, and first or second desired operating voltage to determine a second operating data range and a second operating data rate; and displaying a representation of the second operating data rate and the second operating data range.

3. The method of claim 2, further comprising the steps of comparing the first operating data rate, the first operating data range, and the first desired cost to the second operating data rate, the second operating data range, and the second desired cost; and selecting a final operating data range and a final operating data rate based on the comparison, the final operating data rate being a data rate closest to the first desired data rate or the second desired data rate, and the final operating data range corresponding with the final operating data rate.

4. The method of claim 3, wherein the determining step comprises the steps of:

calculating a first vector sum for the first operating data rate, the first operating range, and the first desired cost;

calculating a second vector sum for the second operating data rate, the second operating range, and the second desired cost;

determining which of the first vector sum and the second vector sum is a smaller total vector distance from its respective desired data range, desired data rate, and desired cost; and selecting the final operating data rate, the final operating range, and the final desired cost based on which set of operating data rate, operating range, and desired cost has a vector sum with the smaller total vector distance.

5. The method of claim 1, wherein the first desired frequency band is the ultra-high frequency band.

6. A computing device configured to optimize design parameters of an RFID tag for use with a RFID reader in a RFID system based on selected design constraints, the computing device comprising:

a first receiver configured to receiver a first desired frequency band that the RFID tag will operate in, a first desired data range between the RFID tag and the RFID reader, a first desired cost for the RFID tag, a first desired data rate for the RFID tag, and a first desired operating voltage for the RFID tag;

a second receiver configured to receive a first carrier modulation period of an interrogation signal generated by the RFID reader within a range of carrier modulation periods, the range of carrier modulation periods constrained by each of the first desired frequency band, the first desired data range, the first desired cost, the first desired data rate, and the first desired operating voltage, the second receiver in communication with the first receiver;

variable means for varying an antenna capacitance of the RFID tag to a desired first capacitance value in conjunction with the first carrier modulation period to generate a first plurality of operating data rates for the RFID tag, the variable means in communication with the second receiver;

first selection means for selecting a first operating data rate of the RFID system and in communication with the variable means, the first operating data rate being the operating data rate of the first plurality of operating data rates nearest to the first desired data rate;

first calculation means for calculating a first operating data range based on the first desired operating voltage and the first operating data rate, the first calculation means in communication with the first selection means; and a display in communication with the first calculation means and configured to generate a representation of the first operating data rate and the first operating data range.

7. The computing device of claim 6, wherein:

the first receiver is further configured to receive at least one of a second desired frequency band, a second desired data range, a second desired cost, a second desired data rate, and a second desired operating voltage;

the second receiver is further configured to receive a second carrier modulation period of the interrogation signal within the range of carrier modulation periods, the range of carrier modulation periods being constrained by the received first or second desired frequency band, first or second desired data range, first or second desired cost, first or second desired data rate, and first or second desired operating voltage;

the variable means is further configured for varying the antenna capacitance to a desired second capacitance value in conjunction with the second carrier modulation period to generate a second plurality of operating data rates;

the first selection means is further configured for selecting a second operating data rate, the second operating data rate being the operating data rate of the second plurality of operating data rates nearest to the second desired data rate;

the first calculation means is further configured for calculating a second operating data range based on the received first or second desired frequency band, first or second desired data range, first or second desired cost, first or second desired data rate, and first or second desired operating voltage to determine a second operating data range and a second operating data rate; and the display is further configured to generate a representation of the second operating data rate and the second operating data range.

8. The computing device of claim 7, further comprising:

comparison means for comparing the first operating data rate, the first operating data range, and the first desired cost to the second operating data rate, the second operating data range, and the second desired cost, the comparison means in communication with the first calculation means; and first determination means for selecting a final operating data range and a final operating data rate based on the comparison, the final operating data rate being a data rate closest to the first desired data rate or the second desired data rate, and the final operating data range corresponding with the final operating data rate, the first determination means in communication with the comparison means.

9. The computing device of claim 8, wherein the first determination means comprises:

second calculation means for calculating a first vector sum for the first operating data rate, the first operating range, and the first desired cost and for calculating a second vector sum for the second operating data rate, the second operating range, and the second desired cost;

second determination means for determining which of the first vector sum and the second vector sum is a smaller total vector distance from its respective desired data range, desired data rate, and desired cost, the second determination means in communication with the second calculation means; and second selection means for selecting the final operating data rate, the final operating range, and the final desired cost based on which set of operating data rate, operating range, and desired cost has a vector sum with the smaller total vector distance.

10. The computing device of claim 6, wherein the first desired frequency band is the ultra-high frequency band.

11. A computer-readable medium comprising instructions for optimizing the design parameters of an RFID tag for use with a RFID reader in a RFID system based on selected design constraints, the instructions, when executed by a processor, cause the processor to perform a method comprising the steps of:

receiving a first desired frequency band that the RFID tag will operate in;

receiving a first desired data range between the RFID tag and the RFID reader;

receiving a first desired cost for the RFID tag;

receiving a first desired data rate for the RFID tag;

receiving a first desired operating voltage for the RFID tag;

receiving a first carrier modulation period of an interrogation signal generated by the RFID reader within a range of carrier modulation periods, wherein the range of carrier modulation periods is constrained by each of the first desired frequency band, the first desired data range, the first desired cost, the first desired data rate, and the first desired operating voltage;

varying an antenna capacitance of the RFID tag to a desired first capacitance value in conjunction with the first carrier modulation period to generate a first plurality of operating data rates for the RFID tag;

selecting a first operating data rate of the RFID system, the first operating data rate being the operating data rate of the first plurality of operating data rates nearest to the first desired data rate;

calculating a first operating data range based on the first desired operating voltage and the first operating data rate; and displaying a representation of the first operating data rate and the first operating data range.

12. The computer-readable medium of claim 11, further comprising instructions that cause the processor to perform the steps of:

receiving at least one of a second desired frequency band, a second desired data range, a second desired cost, a second desired data rate, and a second desired operating voltage;

receiving a second carrier modulation period of the interrogation signal within the range of carrier modulation periods, wherein the range of carrier modulation periods is constrained by the received first or second desired frequency band, first or second desired data range, first or second desired cost, first or second desired data rate, and first or second desired operating voltage;

varying the antenna capacitance to a desired second capacitance value in conjunction with the second carrier modulation period to generate a second plurality of operating data rates;

selecting a second operating data rate, the second operating data rate being the operating data rate of the second plurality of operating data rates nearest to the second desired data rate;

calculating a second operating data range based on the received first or second desired frequency band, first or second desired data range, first or second desired cost, first or second desired data rate, and first or second desired operating voltage to determine a second operating data range and a second operating data rate; and displaying a representation of the second operating data rate and the second operating data range.

13. The computer-readable medium of claim 12, further comprising instructions that cause the processor to perform the steps of:

comparing the first operating data rate, the first operating data range, and the first desired cost to the second operating data rate, the second operating data range, and the second desired cost; and selecting a final operating data range and a final operating data rate based on the comparison, the final operating data rate being a data rate closest to the first desired data rate or the second desired data rate, and the final operating data range corresponding with the final operating data rate.

14. The computer-readable medium of claim 13, further comprising instructions that cause the processor to perform the steps of:

calculating a first vector sum for the first operating data rate, the first operating range, and the first desired cost;

calculating a second vector sum for the second operating data rate, the second operating range, and the second desired cost;

determining which of the first vector sum and the second vector sum is a smaller total vector distance from its respective desired data range, desired data rate, and desired cost; and selecting the final operating data rate, the final operating range, and the final desired cost based on which set of operating data rate, operating range, and desired cost has a vector sum with the smaller total vector distance.

15. The computer-readable medium of claim 11, wherein the first desired frequency band is the ultra-high frequency band.

* * * * *